US012680625B2

(12) United States Patent
Yudanov

(10) Patent No.: US 12,680,625 B2
(45) Date of Patent: Jul. 14, 2026

(54) VALVE ARRANGEMENT FOR A FLUID CONTROL SYSTEM

(71) Applicant: VOLVO TRUCK CORPORATION, Gothenburg (SE)

(72) Inventor: Sergi Yudanov, Västra Frölunda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 5 days.

(21) Appl. No.: 19/045,093

(22) Filed: Feb. 4, 2025

(65) Prior Publication Data

US 2025/0257816 A1     Aug. 14, 2025

(30) Foreign Application Priority Data

Feb. 13, 2024     (EP) ..................................... 24157334

(51) Int. Cl.
*F16K 47/02* (2006.01)
*F16K 17/04* (2006.01)

(52) U.S. Cl.
CPC ............ *F16K 47/02* (2013.01); *F16K 17/048* (2013.01); *F16K 2200/401* (2021.08)

(58) Field of Classification Search
CPC ........ F16K 47/01; F16K 47/02; F16K 17/048; F16K 17/0433; F16K 2200/401; F15B 13/024; F15B 13/0407
See application file for complete search history.

(56) References Cited

U.S. PATENT DOCUMENTS 3,845,932 A * 11/1974 Fontaine ................... B60T 7/12
251/63.4
6,318,702 B1 * 11/2001 Hettel ................. F16K 31/0689
251/64
2013/0306891 A1 11/2013 Fietz et al.

OTHER PUBLICATIONS

Extended European Search Report in corresponding European Application No. 24157334.4 dated Aug. 6, 2024 (6 pages).

* cited by examiner

*Primary Examiner* — Eric Keasel
(74) *Attorney, Agent, or Firm* — Jeffri A. Kaminski; Venable LLP

(57) ABSTRACT

A valve arrangement for a fluid control system has a housing, comprising a fluid inlet, a fluid outlet, and extending along a central axis. The valve arrangement has a valve component, movable along the central axis between a first position, closing the fluid inlet, and a second position, a maximum valve lift defined therebetween. The valve arrangement has a biasing member, biasing the valve component towards the first position, and an intermediate component movable along the central axis, and relative to the valve component. The valve arrangement has a first stop and a second stop, the intermediate component axially movable therebetween, a range of the relative axial movement being less than the maximum valve lift. During an initial axial movement of the valve component from the first position, the intermediate component moves relative to the first stop and the second stop, and upon the intermediate component reaching the limit of the range of relative axial movement a subsequent movement of the valve component is opposed by an intermediate frictional force generated by the intermediate component.

20 Claims, 11 Drawing Sheets

VALVE ARRANGEMENT FOR A FLUID CONTROL SYSTEM

TECHNICAL FIELD

The disclosure relates generally to a valve arrangement. In particular aspects, the disclosure relates to a valve arrangement for a fluid control system. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Valve arrangements, for example pressure relief valves, may be exposed to conditions whereby the valve rapidly oscillates between an open and a closed position, i.e. valve chatter. Valve chatter may lead to damage to the valve arrangement. Therefore, there is a need to develop improved technology relating to such valve arrangements.

SUMMARY

According to a first aspect of the disclosure, a valve arrangement for a fluid control system is provided, comprising: a housing, comprising a fluid inlet, and a fluid outlet, the housing extending along a central axis. The valve arrangement further comprising a valve component, movably arranged along the central axis with respect to the housing between a first position and a second position, wherein at the first position the fluid inlet is closed by the valve component, and wherein a maximum valve lift is defined between the first position and the second position. The valve arrangement further comprising a biasing member, configured to bias the valve component towards the first position, and an intermediate component movably arranged along the central axis with respect to the housing and the valve component. The valve arrangement further comprising a first stop and a second stop, wherein the intermediate component is axially movable relative to the first stop and the second stop, such that: a range of the relative axial movement is delimited by contact between the intermediate component and the first stop, and the intermediate component and the second stop, wherein the range of relative axial movement is less than the maximum valve lift, and such that: during an initial axial movement of the valve component from the first position, the intermediate component moves relative to the first stop and the second stop, and upon the intermediate component reaching the limit of the range of relative axial movement a subsequent movement of the valve component, in the same direction as the initial axial movement, is opposed by an intermediate frictional force generated at least partly by the intermediate component.

The valve arrangement may comprise, for example, a pressure relief valve. The housing may comprise a single part, or alternatively the housing may comprise a plurality of parts configured to be at least positionally fixed in relation to one another. The biasing member may comprise, for example, a spring. The valve arrangement may further comprise a valve seat, wherein the valve component is configured to abut the valve seat at the first position. The valve arrangement may further comprise a valve stop wherein the valve component is configured to abut the valve stop at the second position. Alternatively, the second position may be defined by, for example a limit of the biasing member, such as, where the biasing member comprises a spring, a maximum compression, such as the solid height of the spring. The range of relative axial movement may be between 10% and 50% of the maximum valve lift.

The first aspect of the disclosure may seek to reduce valve chatter. A technical benefit may include, for example, reduced noise and vibration, increased wear resistance and durability, and improved performance.

Optionally in some examples, including in at least one preferred example, the initial axial movement is opposed by an initial frictional force, and wherein the initial frictional force is less than the intermediate frictional force. A technical benefit may include slowing down the movement of the valve component, subsequent to an initial movement from the first position, when moving towards the second position.

Optionally in some examples, including in at least one preferred example, the initial frictional force is at least partly formed by a friction generated between the valve component and the housing. A technical benefit may include the valve component may be guided by the housing during an initial axial movement of the valve component from the first position.

Optionally in some examples, including in at least one preferred example, the initial frictional force is at least partly formed by a friction generated between the intermediate component and the housing. A technical benefit may include the intermediate component may be guided by the housing during an initial axial movement of the valve component from the first position.

Optionally in some examples, including in at least one preferred example, the initial frictional force comprises a metal-to-metal contact. A technical benefit may include that the initial frictional force may comprise a predictable behaviour.

Optionally in some examples, including in at least one preferred example, the intermediate frictional force is generated between the intermediate component and the valve component. A technical benefit may include the valve component may be guided by the intermediate component during a subsequent movement of the valve component, after an initial axial movement, towards the second position.

Optionally in some examples, including in at least one preferred example, the intermediate frictional force is generated between the intermediate component and the housing. A technical benefit may include the intermediate component may be guided by the housing during a subsequent movement of the valve component, after an initial axial movement, towards the second position.

Optionally in some examples, including in at least one preferred example, the intermediate component comprises an intermediate member and a friction member, wherein the intermediate frictional force is generated at least partly by the friction member. A technical benefit may include a friction member may be used having a stable and relatively high dynamic friction to dampen the valve motion.

Optionally in some examples, including in at least one preferred example, the valve component comprises a friction member, wherein the intermediate frictional force is generated at least partly by the friction member. A technical benefit may include a friction member may be used having a stable and relatively high dynamic friction to dampen the valve motion.

Optionally in some examples, including in at least one preferred example, the housing comprises a friction member, wherein the intermediate frictional force is generated at least partly by the friction member. A technical benefit may include a friction member may be used having a stable and relatively high dynamic friction to dampen the valve motion.

Optionally in some examples, including in at least one preferred example, the intermediate member is made of a relatively rigid material such as metal/plastic/ceramic, and the friction member(s) is/are made of a relatively soft and/or elastic material such as PTFE or a rubber/elastomer. A technical benefit may include the friction member may be used having a stable and relatively high dynamic friction to dampen the valve motion.

Optionally in some examples, including in at least one preferred example, the friction member incorporates an energizing resilient element configured to press the friction member towards an opposing surface. A technical benefit may include the resilience of the friction member may be improved, such that a contact with an opposing surface may be improved.

Optionally in some examples, including in at least one preferred example, the friction member is an annular member. A technical benefit may include the friction member may help centre the movement of the valve component in the valve arrangement.

Optionally in some examples, including in at least one preferred example, the intermediate component is an annular shaped component. A technical benefit may include the intermediate component may help centre the movement of the valve component in the valve arrangement.

Optionally in some examples, including in at least one preferred example, the intermediate component is arranged radially inner to the valve component with respect to the central axis of the housing. A technical benefit may include a more compact arrangement may be achieved, in at least some examples.

Optionally in some examples, including in at least one preferred example, the intermediate component is arranged radially outer to the valve component with respect to the central axis of the housing. A technical benefit may include a less complex valve component may be achieved, in at least some examples.

Optionally in some examples, including in at least one preferred example, the valve component comprises a fluid channel configured for communication between the fluid inlet and the fluid outlet when the valve component is not at the first position. A technical benefit may include providing a reduced flow path, in at least some examples.

Optionally in some examples, including in at least one preferred example, the housing comprises a fluid channel configured for communication between the fluid inlet and the fluid outlet when the valve component is not at the first position. A technical benefit may include a less complex valve component may be achieved, in at least some examples.

Optionally in some examples, including in at least one preferred example, the axial distance between the first stop and the second stop is adjustable. A technical benefit may include the valve arrangement may be adjusted for different uses. Furthermore, the valve arrangement may be adjusted over time to account for wear of the valve arrangement.

Optionally in some examples, including in at least one preferred example, the valve arrangement is configured such that when the valve component is located at an initial return position, wherein at the initial return position the valve component is displaced from the first position, during an initial axial return movement of the valve component towards the first position, the intermediate component moves relative to the first stop and the second stop until reaching the limit of the range of relative axial movement.

Optionally in some examples, including in at least one preferred example, the valve arrangement is configured such that when the displacement between the initial return position and the first position is greater than the range of relative axial movement, a subsequent return movement of the valve component, in the same direction as the initial axial return movement, is opposed by an intermediate frictional force generated at least partly by the intermediate component. A technical benefit may include, for example, reduced noise and vibration, increased wear resistance and durability, and improved performance.

According to a second aspect of the disclosure, a vehicle comprising the valve arrangement according to any one of the examples of the first aspect is provided. The second aspect of the disclosure may seek to prevent valve chatter in a valve arrangement of a vehicle. A technical benefit may include reducing damage to the valve arrangement of a vehicle. Technical effects and advantages of the second aspect are analogous to the technical effects and advantages of the first aspect.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

The drawings are schematic and may not necessarily be drawn to scale. Like reference characters throughout the drawings refer to the same or similar element unless stated otherwise. Some reference characters in some of the drawings may have been omitted for the sake of clarity.

DETAILED DESCRIPTION

The detailed description set forth below provides information and examples of the disclosed technology with sufficient detail to enable those skilled in the art to practice the disclosure.

Valve arrangements, for example pressure relief valves, may be exposed to conditions whereby the valve rapidly oscillates between an open and a closed position, i.e. valve chatter. Conditions may include excessive inlet pressure drop, or excessive backpressure, and causes may include incorrect valve sizing, or turbulence.

Valve chatter may lead to damage to the valve arrangement as well as to upstream or downstream hydraulic components of a system. Damage caused by valve chatter may include damage to the valve seat, misalignment of the valve, spring failure, or mechanical failure of the valve component.

Therefore, there is a need to develop improved technology relating to such valve arrangements.

Figure 1:
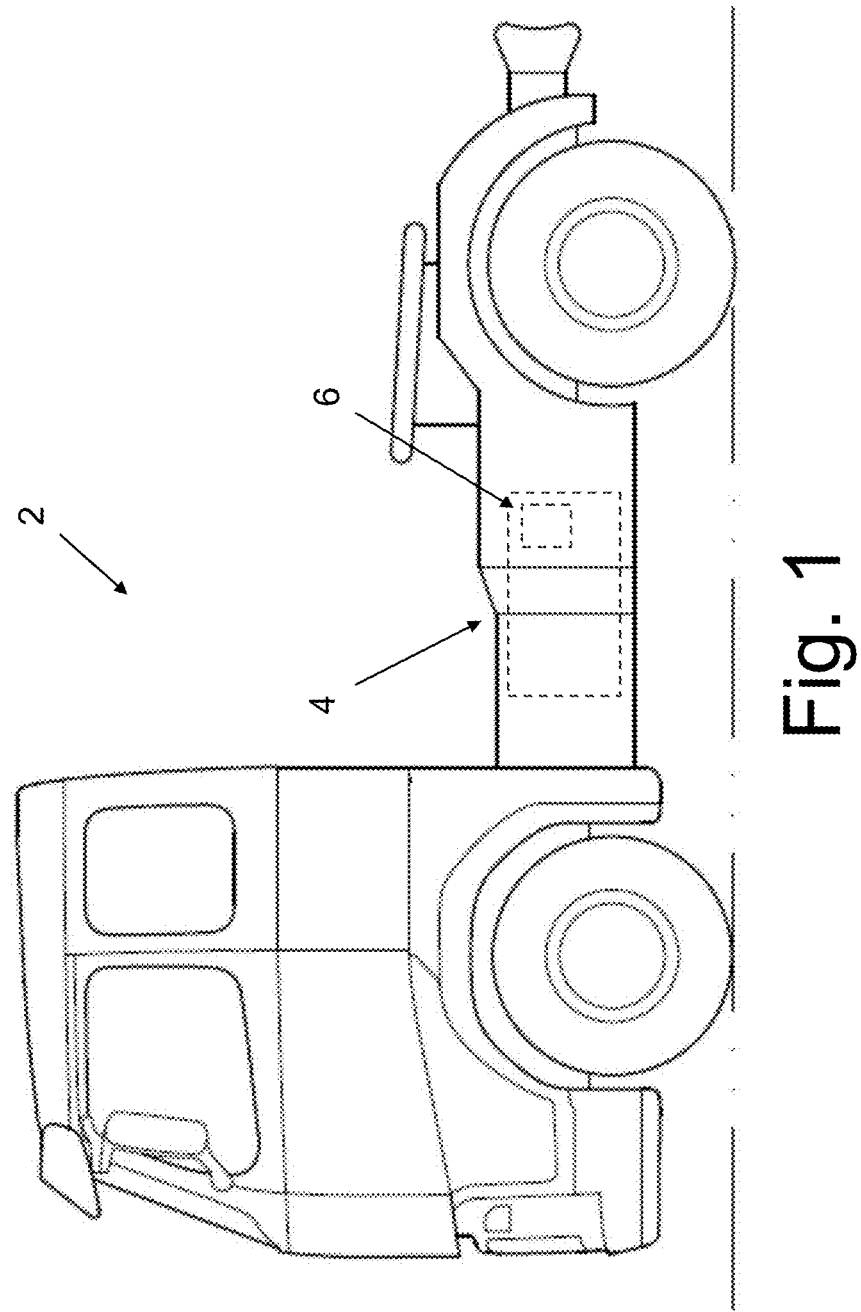
FIG. 1 is an exemplary vehicle according to an example.

FIG. 1 is an exemplary illustration of the present disclosure, comprising a side view of a vehicle 2, in the form of a truck 2, according to an example. Whilst the shown aspect comprises a truck 2, the vehicle 2 may comprise any type of vehicle such as a car, bus, industrial vehicle, plane, train, marine vessel, etc.

In the shown example, the vehicle 2 comprises a fluid control system 4, such as for a hydraulic or pneumatic system. The fluid control system 4 may be configured for the control of fuel, braking fluid, motor oil, transmission fluid, coolant, or any known fluid used for a function of the vehicle 2. The fluid control system 4 may comprise a fluid source, for example a reservoir, a fluid destination, for example a nozzle, and a fluid pathway extending therebetween. In at least some examples, the fluid control system 4 may comprise a looped fluid pathway.

Alternatively, the present disclosure may relate to a fluid control system 4 used for an application other than for a vehicle.

The fluid control system 4 comprises a valve arrangement 6.

FIGS. 2*a*-2*d* show an exemplary valve arrangement 6 for a fluid control system 4 according to an example. The valve arrangement 6 may be, for example, a pressure relief valve configured to regulate the pressure in the fluid control system 4. The valve arrangement 6 comprises a housing 8. The housing 8 comprises a fluid inlet 10, and a fluid outlet 12. The fluid inlet 10 is in fluid communication with the fluid pathway (not shown) of the fluid control system 4. The housing 8 extends along a central axis X. In the shown example, both the fluid inlet 10, and the fluid outlet 12 are located along the central axis X, at opposite sides of the housing 8. In at least some examples the fluid inlet 10 and/or the fluid outlet 12 may be located peripheral to the central axis, for example the fluid inlet 10 may extend along the central axis X and the fluid outlet 12 may extend at an angle to the central axis X, for example perpendicular to the central axis X.

The housing 8 may comprise a single part, or alternatively the housing 8 may comprise a plurality of parts configured to be at least positionally fixed in relation to one another, for example parts of the housing 8 may be joined together, or alternatively parts of the housing 8 may be fixed by being joined to the same element, for example a bracket, or the like. The housing 8 may comprise a metal such as aluminium, stainless steel, etc., or a plastic, or a combination thereof.

Figure 2A:
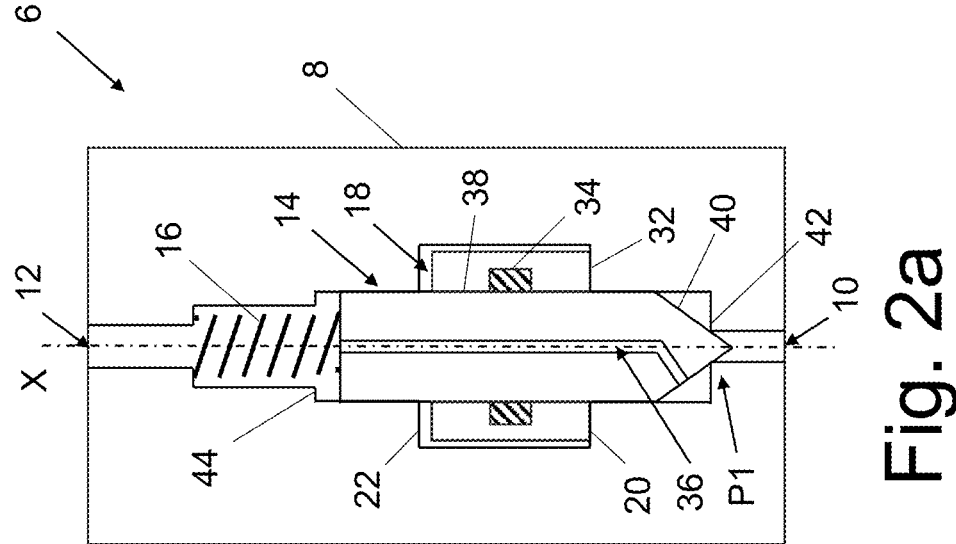
FIG. 2a is an exemplary valve arrangement according to an example.
Figure 2B:
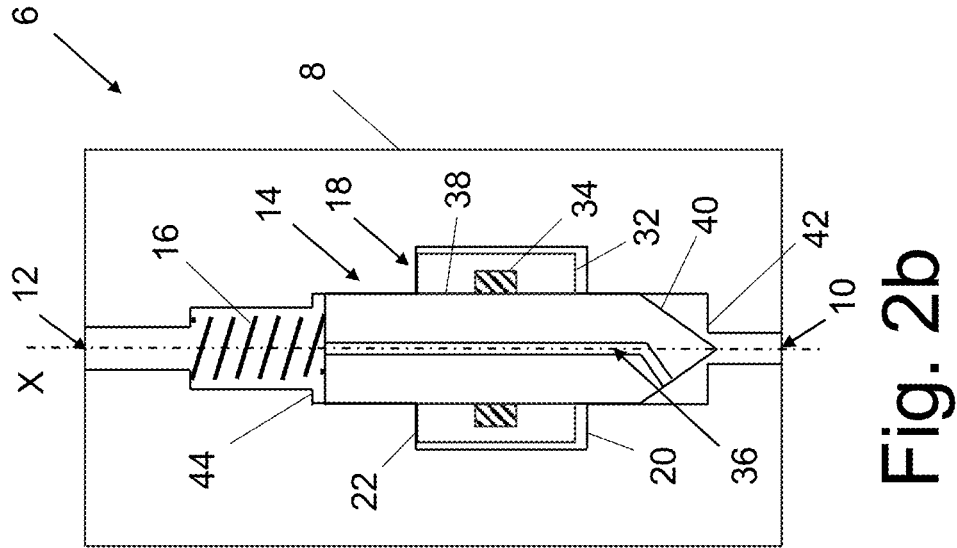
FIG. 2b is an exemplary valve arrangement according to an example.
Figure 2C:
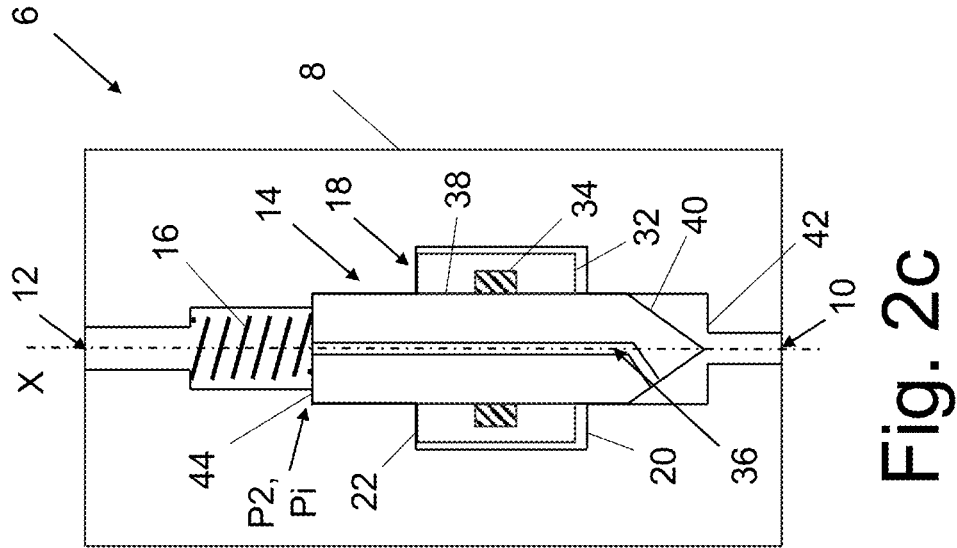
FIG. 2c is an exemplary valve arrangement according to an example.

The valve arrangement 6 further comprises a valve component 14, movably arranged along the central axis X with respect to the housing 8 between a first position P1, shown in FIG. 2*a* and a second position P2, shown in FIG. 2*c*, and wherein a maximum valve lift is defined between the first position P1 and the second position P2. Furthermore, in the shown example the valve component 14 is located between the fluid inlet 10 and the fluid outlet 12, in at least some examples at least a portion of the valve component 14 may extend beyond the fluid outlet 12 along the central axis X.

In at least some examples the fluid inlet 10 is configured such that a flow of fluid in the fluid pathway may apply a force on the valve component 14, wherein said force has a component acting parallel to the central axis X.

In the shown example the valve component 14 comprises a first portion 38 and a second portion 40 which are integrally formed, wherein the first portion 38 comprises a cylindrical shape, and the second portion 40 comprises a conical shape. The first portion 38 is arranged such that it is guided by the housing 8. In alternative examples the valve component 14 may be formed simply by a cylindrical shape, a conical shape, or any other shape. In at least some examples the valve component 14 may comprise a valve disc, wherein the flow of fluid in the fluid pathway may apply a force on the valve disc.

At the first position P1 the fluid inlet 10 is closed by the valve component 14. The valve arrangement 6 may further comprise a valve seat 42, arranged at the fluid inlet 10, wherein the valve component 14 is configured to abut the valve seat 42 at the first position P1. The valve seat 42 may comprise a hardened metal alloy, which may for example be press fit to the housing 8. In the shown example the second portion 40 is configured such that it extends through the inlet 10 at the first position P1. In alternative examples the second portion 40 is configured such that it closes the inlet 10 without extending therein, whereby a surface of the second portion 40 extends radially outer to the fluid inlet 10, and abuts with, for example, the valve seat 42. In the shown example the fluid inlet 10 comprises a constant cross-sectional area, in at least some examples the cross-sectional area along the inlet may be non-constant, for example the cross-sectional area may vary linearly or non-linearly, or the inlet may comprise a stepped configuration.

In the shown example the valve component 14 comprises a fluid channel 36 configured for communication between the fluid inlet 10 and the fluid outlet 12 when the valve component 14 is not at the first position P1. In at least some examples fluid communication between the fluid inlet 10 and the fluid outlet 12 may only occur when valve component 14 is moved from the first position P1 by more than a threshold amount. In alternative examples the fluid channel 36, configured to provide fluid communication between the fluid inlet 10 and the fluid outlet 12 may be formed, for example, in the valve housing 8, or alternatively a plurality of fluid channels 36.

The valve arrangement 6 may comprise a valve stop 44 wherein the valve component 14 is configured to abut the valve stop 44 at the second position P2. In the shown example the valve stop 44 comprises a stepped portion of the housing 8, wherein a surface extends radially inwards such that it abuts a surface of the first portion 38 of the valve component 14 at the second position P2. The valve stop 44 may comprise a hardened metal alloy, which may for example be press fit to the housing 8. In alternative examples the valve stop 44 may comprise a radially extending member, such as a flange, projection, or the like, configured to abut with the valve component 14. Furthermore, the valve component 14 may comprise a radially extending member, such as a flange, projection, or the like, configured to abut with the valve stop 44.

The valve arrangement 6 further comprises a biasing member 16, configured to bias the valve component 14 towards the first position P1. In the shown example the biasing member 16 comprises a spring, however in at least some examples the biasing member 16 may comprise an elastically deformable material, a pneumatic cylinder, a hydraulic cylinder, or the like. In the shown example the biasing element 16 is located between the valve component 14 and the fluid outlet 12, in at least some examples the biasing element may be located between any portion of the valve component 14 and any part fixed relative to the housing 8, which may be located between the fluid inlet and the fluid outlet 12, or otherwise.

In at least some examples, the second position P2 may be defined by the limit of the biasing member 16, such as, where the biasing member 16 comprises a spring, a maximum compression, such as the solid height of the spring.

The valve arrangement 6 further comprises an intermediate component 18 movably arranged along the central axis X with respect to the housing 8 and the valve component 14.

In the shown example the intermediate component 18 is an annular shaped component. Furthermore, the intermediate component 18 is arranged radially outer to the valve component 14 with respect to the central axis X of the housing 8. The intermediate component 18 may as shown comprise an intermediate member 32 and a friction member 34. In the shown example the friction member 34 is located between the intermediate member 32 and the valve component 14. In the shown example the friction member 34 is configured to increase the frictional force acting between the intermediate component 18 and the valve component 14. Alternatively, an increase in the frictional force may be achieved, for example, by a surface finish on the intermediate component 18, on a surface configured to contact the valve component 14. The intermediate member 32 may be made of a relatively rigid material such as metal/plastic/ceramic, and the friction member 34 may be made of a relatively soft and/or elastic material such as PTFE (Polytetrafluoroethylene) or a rubber/elastomer. Furthermore, as shown, the intermediate member 32 may be formed having a groove, and wherein the friction member 34 is located in the groove, such that the friction member 34 may be fixed for axial movement with the intermediate member 32, or alternatively the friction member 34 may be at least partially axially movable relative to the intermediate component 18. In at least some examples the friction member 34 may be fixed to the intermediate member 32 by adhesive, or the like. In the shown example the friction member 34 is an annular member, wherein the friction member 34 is formed as a ring. The friction member 34 may incorporate an energizing resilient element configured to press the friction member 34 towards an opposing surface. The resilient element may comprise, for example, steel, and may be formed as a spring element.

In at least some examples a fluid channel may be formed by said intermediate component 18, wherein said fluid channel may be formed through said intermediate component 18, and/or around said intermediate component 18, alternatively the intermediate component 14 may be configured such that it performs a sealing function.

The valve arrangement 6 further comprises a first stop 20 and a second stop 22. The first stop 20 and/or the second stop 22 may be formed integrally with the housing 8. Alternatively, the first stop 20 and/or the second stop 22 may be positionally fixed relative to the housing 8. In at least some examples the axial distance between the first stop 20 and the second stop 22 may be adjustable. Adjustment of the distance between the first stop 20 and the second stop 22 may comprise, for example, adjusting the position of the first stop 20 and/or the second stop 22. Adjustment of the distance between the first stop 20 and the second stop 22 may comprise, for example, removal and replacement of the first stop 20 and/or the second stop 22 with different sized elements, the first stop 20 and/or the second stop 22 may comprise a plurality of elements, which may be added/subtracted, the first stop 20 and/or the second stop 22 may comprise a screw mechanism, or an actuator which may be controlled manually or automatically. Furthermore, adjustment of the axial distance between the first stop 20 and the second stop 22 may be achieved by adjusting the housing 8.

Figure 2D:
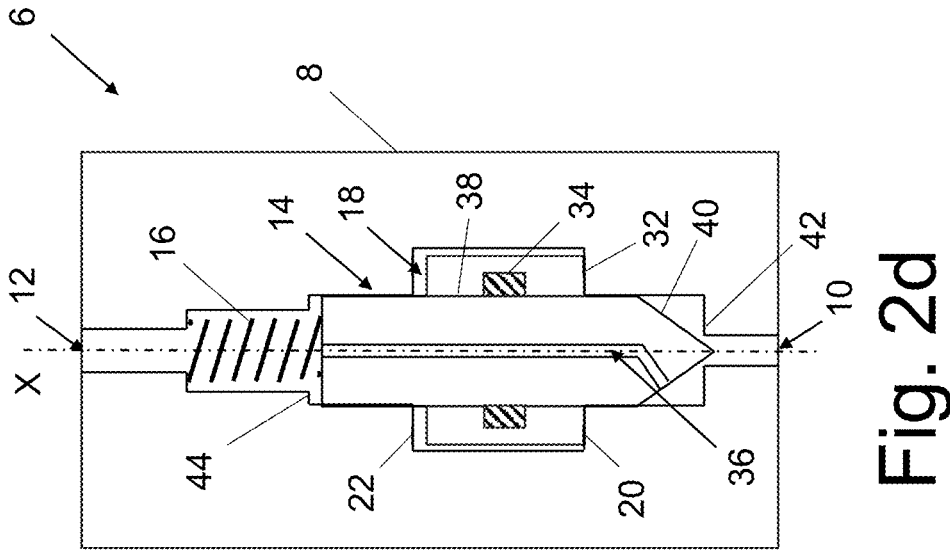
FIG. 2d is an exemplary valve arrangement according to an example.

The intermediate component 18 is axially movable relative to the first stop 20 and the second stop 22, and the valve arrangement 6 is configured such that: a range of the relative axial movement of the intermediate component 18 is delimited by contact between the intermediate component 18 and the first stop 20, shown in FIG. 2a and FIG. 2d, and the intermediate component 18 and the second stop 22, shown in FIG. 2b and FIG. 2c. The range of relative axial movement is less than the maximum valve lift. The range of relative axial movement may be, for example, between 10% and 50% of the maximum valve lift. In at least some examples the range of the relative axial movement of the intermediate component 18 may be adjusted by the adjustment of the first stop 20 and/or the second stop 22. Furthermore, in at least some examples the range of the relative axial movement of the intermediate component 18 may be adjusted by adjusting the axial height of the intermediate component 18, wherein the adjustment may comprise, for example, removal and replacement of intermediate component 18 with different sized elements, intermediate component 18 may comprise a plurality of elements, which may be added/subtracted, or an actuator which may be controlled manually or automatically.

FIG. 2A shows an initial condition of the valve arrangement 6. The initial condition is configured to occur when the force applied in the axial direction on the valve component 14, for example, due to the pressure of the fluid in the fluid pathway of the fluid control system 4, is less than the sum of an initial frictional force and the force applied by the biasing member 16, and wherein the force applied in the axial direction on the valve component 14 has been less than the sum of the initial frictional force and the force applied by the biasing member 16 for a period of time such that the position of the valve component 14 has been suitably reset.

In the shown example the initial frictional force is generated between the valve component 14 and the housing 8. Furthermore, an intermediate frictional force is generated between the intermediate component 18 and the valve component 14.

The valve arrangement 6 is further configured such that: during an initial axial movement of the valve component 14 from the first position P1, the intermediate component 18 moves relative to said first stop 20 and said second stop 22.

In the shown example the initial axial movement from the first position P1 is opposed by the initial frictional force, wherein the initial frictional force is less than the intermediate frictional force.

At the initial condition the valve component 14 is at the first position P1, and the intermediate component abuts the first stop 20.

When, for example the pressure in the fluid pathway is sufficient so as to overcome both a force applied by the biasing element 16 and an initial frictional force the initial axial movement of the valve component 14 from the first position P1 occurs.

In the shown example during the initial axial movement of the valve component 14 from the first position P1 the intermediate component 18 moves with the valve component 14.

In the shown example the intermediate component 18 moves with the valve component 14 until the intermediate component 18 abuts the second stop 22, shown in FIG. 2*b*. The second stop 22 defining the limit of the range of relative axial movement of the intermediate component 18.

The valve arrangement 6 is further configured such that: upon the intermediate component 18 reaching the limit of said range of relative axial movement a subsequent movement of the valve component 14, in the same direction as the initial axial movement, is opposed by the intermediate frictional force generated at least partly by the intermediate component 18. In the shown example the intermediate frictional force comprises a frictional force generated between the intermediate component 18 and the valve component 14. Furthermore, in the shown example the valve component 14 contacts the housing 8, such that the intermediate frictional force comprises a frictional force acting between the valve component 14 and the housing 8. By maintaining contact along the range of movement between the first position P1 and the second position P2 the valve component 14 may be guided, such that it does not deviate from the central axis X. When the intermediate component 18 abuts the second stop 22, and when the force applied in the axial direction on the valve component 14, for example, due to the pressure of the flow in the fluid pathway of the fluid control system 4 and/or inertia of the valve component, is sufficient to overcome both a force applied by the biasing element 16 and the intermediate frictional force, the subsequent movement will occur.

During the subsequent movement the intermediate component 18 does not move relative to the first stop 20 and the second stop 22. Therefore, in the shown example the valve component 14 moves relative to the intermediate component 18. The movement of the valve component 14 may continue until, for example, the valve component 14 abuts the valve stop 44, shown in FIG. 2*c*. The valve arrangement 6 may be configured such that when the valve component 14 is located at an initial return position Pi, wherein at the initial return position the valve component 14 is displaced from the first position P1 during an initial axial return movement of the valve component 14 towards first position P1, the intermediate component 18 moves relative to the first stop 20 and the second stop 22 until reaching the limit of the range of relative axial movement.

The initial return position Pi of valve component 14 may comprise any position of the valve component 14 where the valve component 14 is displaced from the first position P1. In the shown example the initial return position Pi coincides with the second position P2. In at least some examples the initial return position Pi may be located anywhere between the first position P2 and the second position P2.

When, for example the biasing force applied by the biasing element 16 is sufficient so as to overcome both a force applied by the pressure in the fluid pathway and the initial frictional force the initial axial return movement of the valve component 14 towards the first position P1 occurs.

In the shown example during the initial axial return movement of the valve component 14 the intermediate component 18 moves with the valve component 14, moving relative to the first stop 20 and the second stop 22.

Furthermore, the intermediate component 18 moves with the valve component 14 until the intermediate component 18 abuts the first stop 20. The first stop 20 defining the limit of the range of relative axial movement of the intermediate component 18.

In the shown example, the valve arrangement 6 is configured such that when the displacement between the initial return position Pi and the first position P1 is greater than the range of relative axial movement, a subsequent return movement of the valve component 14, in the same direction as the initial axial return movement, is opposed by an intermediate frictional force generated at least partly by the intermediate component 18. In the shown example the intermediate frictional force comprises a frictional force generated between the intermediate component 18 and the valve component 14. Furthermore, in the shown example the valve component 14 contacts the housing 8, such that the intermediate frictional force comprises a frictional force acting between the valve component 14 and the housing 8. By maintaining contact along the range of movement between the second position P2 and the first position P1 the valve component 14 may be guided, such that it does not deviate from the central axis X. When the intermediate component 18 abuts the first stop 20, and when the force applied by the biasing element 16 is sufficient to overcome both a force applied in the axial direction on the valve component 14, for example, due to the pressure of the flow in the fluid pathway of the fluid control system 4, and the intermediate frictional force, the subsequent return movement will occur.

Figure 3:
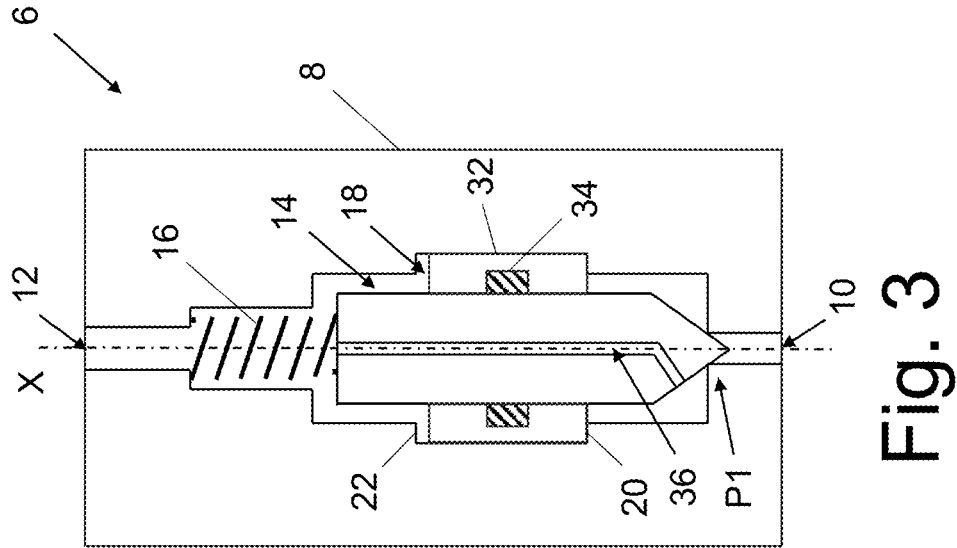
FIG. 3 is an exemplary valve arrangement according to an example.

FIG. 3 shows an exemplary valve arrangement 6 according to an example. The shown example differs from the example of FIG. 2*a*-2*d* in that the valve component 14 is not guided by the housing 8, such that no frictional force acts between the surface of the valve component 14 and the housing 8.

In the shown example the initial frictional force is at least partly formed by a friction generated between the intermediate component 18 and the housing 8. Furthermore, the movement of the valve component 14, between the first position P1 and the second position P2, is guided by the intermediate component 18. In the shown example the intermediate frictional force is generated between said intermediate component 18 and the valve component 14. Furthermore, during the initial axial movement, the intermediate component is guided by the housing 8.

In at least some examples the movement of the valve component 14, between the first position P1 and the second position P2, may be guided at least partially by the housing 8 and the intermediate component 18, such that both the valve component 14, and the intermediate component 18 are in contact with the housing 8, and frictional forces are generated therebetween.

Figure 4:
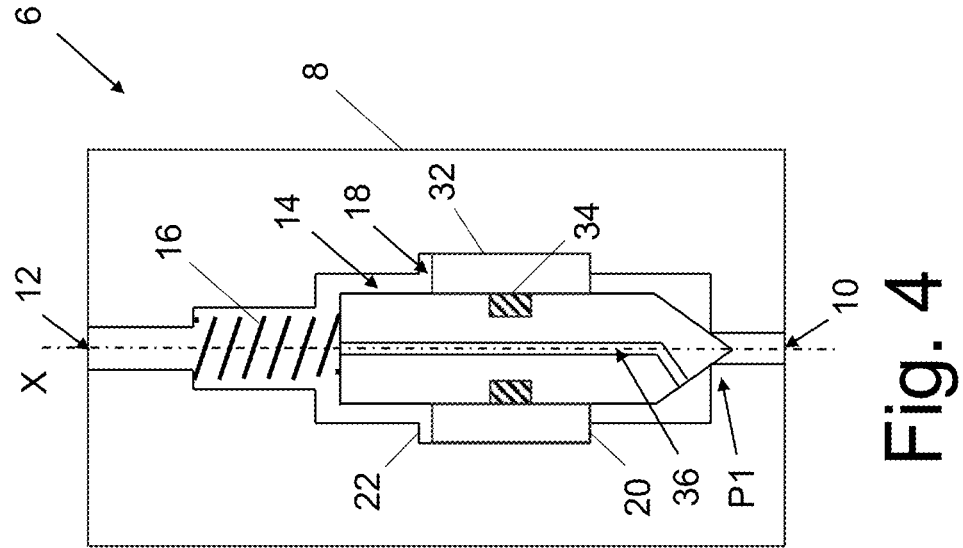
FIG. 4 is an exemplary valve arrangement according to an example.

FIG. 4 shows an exemplary valve arrangement 6 according to an example. The shown example differs from the example of FIG. 3 in that the intermediate component 18 does not comprise a friction member 34, instead the valve component 14 comprises a friction member 34, wherein the intermediate frictional force is generated at least partly by the friction member 34.

The friction member 34 may be made of a relatively soft and/or elastic material such as PTFE or a rubber/elastomer. Furthermore, the valve component 14 is formed having a groove, and wherein the friction member 34 is located in the groove, such that the friction member 34 is fixed for axial movement with the valve component 14, or alternatively the friction member 34 may be at least partially axially movable relative to the valve component 14. In at least some examples the friction member 34 may be fixed to the valve component 14 by adhesive, or the like. In the shown example the friction member 34 is an annular member, wherein the friction member 34 is formed as a ring. The friction member 34 may incorporate an energizing resilient element configured to press the friction member 34 towards an opposing surface. The resilient element may comprise, for example, steel, and may be formed as a spring element.

Alternatively, an increase in the frictional force may be achieved, for example, by a surface finish on the valve component 14, on a surface configured to contact the intermediate component 18.

Figure 5:
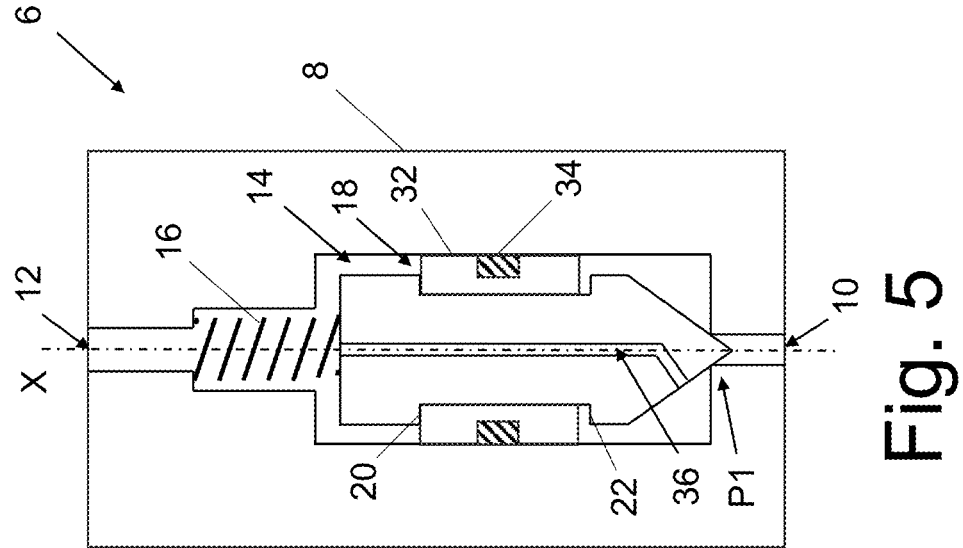
FIG. 5 is an exemplary valve arrangement according to an example.

FIG. 5 shows an exemplary valve arrangement 6 according to an example. The shown example differs from the example of FIG. 3 in that the valve component 14 comprises the first stop 20 and the second stop 22. Furthermore, the intermediate frictional force is generated between the intermediate component 18 and the housing 8.

The first stop 20 and/or the second stop 22 may be formed integrally with the valve component 14. Alternatively, the first stop 20 and/or the second stop 22 may be positionally fixed relative to the valve component 14. In at least some examples the axial distance between the first stop 20 and the second stop 22 may be adjustable, as described with reference to FIGS. 2a-2d. Furthermore, adjustment of the axial distance between the first stop 20 and the second stop 22 may be achieved by adjusting the valve component 14.

In the shown example the intermediate component 18 is axially movable relative to the first stop 20 and the second stop 22, whereby the range of the relative axial movement of the intermediate component 18 is delimited by contact between the intermediate component 18 and the first stop 20, and the intermediate component 18 and the second stop 22. The range of relative axial movement is less than the maximum valve lift, for example the range of relative axial movement may be between 10% and 50% of the maximum valve lift. In at least some examples the range of the relative axial movement of the intermediate component 18 may be adjusted by the adjustment of the first stop 20 and/or the second stop 22. Furthermore, in at least some examples the range of the relative axial movement of the intermediate component 18 may be adjusted by adjusting the axial height of the intermediate component 18, as described with reference to FIGS. 2a-2d.

In the shown example an initial frictional force is generated between the valve component 14 and the intermediate component 18. Furthermore, an intermediate frictional force is generated between the intermediate component 18 and the housing 8.

In at least some examples the housing 8 may comprise a friction member 34, wherein the intermediate frictional force is generated at least partly by the friction member 34 of the housing 8.

Alternatively, an increase in the frictional force may be achieved, for example, by a surface finish on the housing 8, on a surface configured to contact the intermediate component 18.

In the shown example during the initial axial movement of the valve component 14 from the first position P1 the valve component 14 moves relative to the intermediate component 18, and the intermediate component 18 does not move relative to the housing 8, such that the intermediate component moves relative to the first stop 20 and the second stop 22.

Furthermore, the intermediate component 18 does not move relative to the housing 8 until the intermediate component 18 abuts the second stop 22. The second stop 22 defining the limit of the range of relative axial movement of the intermediate component 18.

In the shown example upon the intermediate component 18 abutting the second stop 22 a subsequent movement of the valve component 14, in the same direction as the initial axial movement, is opposed by an intermediate frictional force generated at least partly by the intermediate component 18.

Furthermore, during the subsequent movement the intermediate component 18 does not move relative to the first stop 20 and the second stop 22. Therefore, in the shown example the intermediate component 18 moves with the valve component 14.

Figure 6:
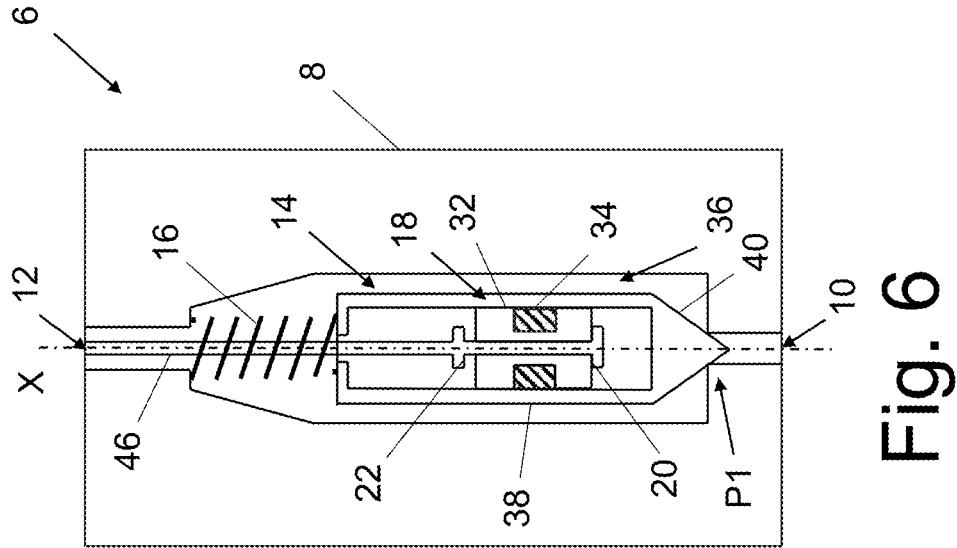
FIG. 6 is an exemplary valve arrangement according to an example.

FIG. 6 shows an exemplary valve arrangement 6 according to an example. The shown example differs from the example of FIG. 3 in that the intermediate component 18 is arranged radially inner to the valve component 14 with respect to the central axis X of the housing 8. Furthermore, the housing 8 comprises a fluid channel 36 configured for communication between the fluid inlet 10 and the fluid outlet 12 when the valve component 14 is not at the first position P2.

In the shown example the housing 8 comprises a shaft 46. The housing 8 may be formed integrally having a shaft 46 therewith. Alternatively, the housing 8 may comprise a plurality of parts, wherein the shaft 46 may comprises one of the parts, the plurality of parts configured to be at least positionally fixed in relation to one another, for example parts of the housing 8 may be joined together, or alternatively parts of the housing 8 may be fixed by being joined to the same element, for example a bracket, or the like. The shaft 46 extends along the central axis X. The housing 8 may comprise a metal such as aluminium, stainless steel, etc., or a plastic, or a combination thereof.

In the shown example the intermediate component 18 is movably arranged along the shaft 46 with respect to the housing 8 and the valve component 14. In the shown example the valve component 14 is supported only by the intermediate component 18, in at least some examples the valve component 14 may be at least partially guided on a radially inner facing surface by the shaft 46 and/or on a radially outer facing surface by the housing 8.

In the shown example the intermediate component 18 comprises an annular member arranged radially outer to the shaft 46 with respect to the central axis X of the housing 8. Furthermore, the intermediate component 18 comprises an intermediate member 32 and a friction member 34, wherein the intermediate frictional force is generated at least partly by the friction member 34. In the shown example the friction member 34 is located between the intermediate member 32 and the valve component 14. In the shown example the friction member 34 is configured to increase the frictional force acting between the intermediate component 18 and the valve component 14.

In the shown example the valve arrangement 6 further comprises a first stop 20 and a second stop 22. The first stop 20 and/or the second stop 22 may be formed integrally with the shaft 46. Alternatively, the first stop 20 and/or the second stop 22 may be positionally fixed relative to the shaft 46. In at least some examples the axial distance between the first stop 20 and the second stop 22 may be adjustable, as described with reference to FIGS. 2a-2d. Furthermore, adjustment of the axial distance between the first stop 20 and the second stop 22 may be achieved by adjusting the shaft 46.

In the shown example the first stop 20, the second stop 22, and the intermediate component 18 are located inside the first portion 38 of the valve component 14, wherein the first portion 38 is located between the biasing element 16, and the fluid inlet 10, and the fluid outlet 12 and the fluid inlet 10. In at least some examples a portion of the valve component 14 may extend beyond the biasing element 16 and/or the fluid outlet 12, such that the first stop 20, the second stop 22, and the intermediate component 18 may be located beyond the biasing element 16 and/or the fluid outlet 12.

In the shown example the intermediate component 18 is axially movable relative to the first stop 20 and the second stop 22, whereby the range of the relative axial movement of the intermediate component 18 is delimited by contact between the intermediate component 18 and the first stop 20 and the intermediate component 18 and the second stop 22. The range of relative axial movement is less than the maximum valve lift, for example the range of relative axial movement may be between 10% and 50% of the maximum valve lift. In at least some examples the range of the relative axial movement of the intermediate component 18 may be adjusted by the adjustment of the first stop 20 and/or the second stop. Furthermore, in at least some examples the range of the relative axial movement of the intermediate component 18 may be adjusted by adjusting the axial height of the intermediate component 18, as described with reference to FIGS. 2a-2d.

In the shown example the movement of the valve component 14, between the first position P1 and the second position P2, is guided by the intermediate component 18. During the initial axial movement, the intermediate component 18 is guided by the shaft 46, such that the initial frictional force is generated between the intermediate component 18 and the shaft 46. During the subsequent movement the intermediate component 18 maintains contact with the shaft 46 and the valve component 14 is guided by the intermediate component 18.

In the shown example the housing 8 comprises a fluid channel 36 configured for communication between the fluid inlet 10 and the fluid outlet 12 when the valve component 14 is not at the first position P2. The fluid channel 36 formed between the housing 8 and the valve component 14. In at least some examples the fluid channel 36 may at least partially be formed through said housing in a channel formed exclusively for facilitating the flow of the fluid.

Figure 7:
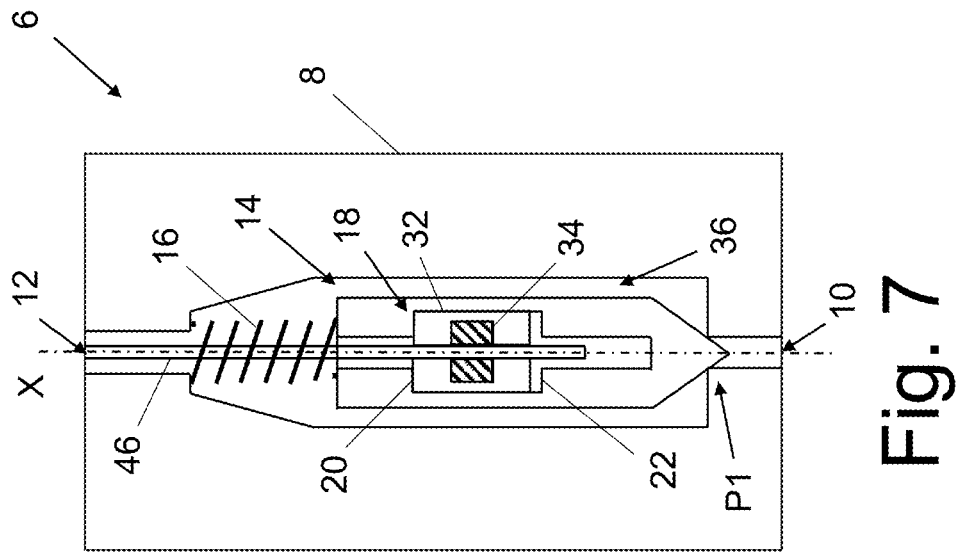
FIG. 7 is an exemplary valve arrangement according to an example.

FIG. 7 shows an exemplary valve arrangement 6 according to an example. The shown example differs from the example of FIG. 6 in that the valve component 14 comprises the first stop 20 and the second stop 22. Furthermore, the intermediate frictional force is generated between the intermediate component 18 and the shaft 46.

The first stop 20 and/or the second stop 22 may be formed integrally with the valve component 14. Alternatively, the first stop 20 and/or the second stop 22 may be positionally fixed relative to the valve component 14. In at least some examples the axial distance between the first stop 20 and the second stop 22 may be adjustable.

In the shown example the intermediate component 18 is axially movable relative to the first stop 20 and the second stop 22, whereby the range of the relative axial movement of the intermediate component 18 is delimited by contact between the intermediate component 18 and the first stop 20, and the intermediate component 18 and the second stop 22. The range of relative axial movement is less than the maximum valve lift.

In the shown example an initial frictional force is generated between the valve component 14 and the intermediate component 18. Furthermore, an intermediate frictional force is generated between the intermediate component 18 and the shaft 46.

In at least some examples the shaft 46 may comprise a friction member, wherein the intermediate frictional force is generated at least partly by the friction member of the shaft 46.

In the shown example during the initial axial movement of the valve component 14 from the first position P1 the valve component 14 moves relative to the intermediate component 18, and the intermediate component 18 does not move relative to the shaft 46, such that the intermediate component moves relative to the first stop 20 and the second stop 22.

Furthermore, the intermediate component 18 does not move relative to the shaft 46 until the intermediate component 18 abuts the second stop 22. The second stop 22 defining the limit of the range of relative axial movement of the intermediate component 18.

In the shown example upon the intermediate component 18 abutting the second stop 22 a subsequent movement of the valve component 14, in the same direction as the initial axial movement, is opposed by an intermediate frictional force generated at least partly by the intermediate component 18.

Furthermore, during the subsequent movement the intermediate component 18 does not move relative to the first stop 20 and the second stop 22. Therefore, in the shown example the intermediate component 18 moves with the valve component 14.

Figure 8:
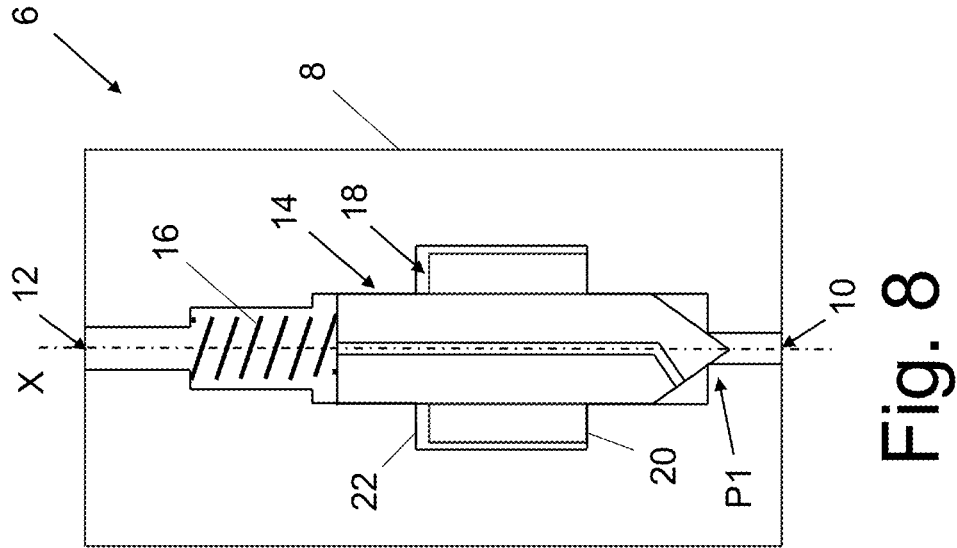
FIG. 8 is another view of FIG. 2a, according to an example.

FIG. 8 is another view of FIG. 1, according to an example. In the shown example a valve arrangement 6 for a fluid control system 4, comprising: a housing 8, comprising a fluid inlet 10, and a fluid outlet 12, the housing 8 extending along a central axis X. The valve arrangement 6 further comprising a valve component 14, movably arranged along the central axis X with respect to the housing 8 between a first position P1 and a second position P2, wherein at the first position P1 the fluid inlet 10 is closed by the valve component 14, and wherein a maximum valve lift is defined between the first position P1 and the second position P2. The valve arrangement 6 further comprising a biasing member 16, configured to bias the valve component 14 towards the first position P1, an intermediate component 18 movably arranged along the central axis X with respect to the housing 8 and the valve component 14. The valve arrangement 6 further comprising a first stop 20 and a second stop 22. Wherein the intermediate component 18 is axially movable relative to the first stop 20 and the second stop 22. Wherein the valve arrangement 6 is configured such that a range of the relative axial movement is delimited by contact between the intermediate component 18 and the first stop 20, and the intermediate component 18 and the second stop 22, wherein the range of relative axial movement is less than the maximum valve lift, and such that: during an initial axial movement of the valve component 14 from the first position P1, the intermediate component 18 moves relative to the first stop 20 and the second stop 22, and upon the intermediate component 18 reaching the limit of the range of relative axial movement a subsequent movement of the valve component 14, in the same direction as the initial axial movement, is opposed by an intermediate frictional force generated at least partly by the intermediate component 18.

In the following, possible features and feature combinations of the present disclosure are presented as a list of examples.

Example 1: a valve arrangement 6 for a fluid control system 4, comprising: a housing 8, comprising a fluid inlet 10, and a fluid outlet 12, the housing 8 extending along a central axis X. The valve arrangement 6 further comprising a valve component 14, movably arranged along the central axis X with respect to the housing 8 between a first position P1 and a second position P2, wherein at the first position P1 the fluid inlet 10 is closed by the valve component 14, and wherein a maximum valve lift is defined between the first position P1 and the second position P2. The valve arrangement 6 further comprising a biasing member 16, configured to bias the valve component 14 towards the first position P1, an intermediate component 18 movably arranged along the central axis X with respect to the housing 8 and the valve component 14. The valve arrangement 6 further comprising a first stop 20 and a second stop 22. Wherein the intermediate component 18 is axially movable relative to the first stop 20 and the second stop 22. Wherein the valve arrangement 6 is configured such that a range of the relative axial movement is delimited by contact between the intermediate component 18 and the first stop 20, and the intermediate component 18 and the second stop 22, wherein the range of relative axial movement is less than the maximum valve lift, and such that: during an initial axial movement of the valve component 14 from the first position P1, the intermediate component 18 moves relative to the first stop 20 and the second stop 22, and upon the intermediate component 18 reaching the limit of the range of relative axial movement a subsequent movement of the valve component 14, in the same direction as the initial axial movement, is opposed by an intermediate frictional force generated at least partly by the intermediate component 18.

Example 2: the valve arrangement 6 of example 1, wherein the initial axial movement is opposed by an initial frictional force, and wherein the initial frictional force is less than the intermediate frictional force.

Example 3: the valve arrangement 6 of example 2, wherein the initial frictional force is at least partly formed by a friction generated between the valve component 14 and the housing 8.

Example 4: the valve arrangement 6 of any one of examples 2-3, wherein the initial frictional force is at least partly formed by a friction generated between the intermediate component 18 and the housing 8.

Example 5: the valve arrangement 6 of any one of the preceding examples, wherein the intermediate frictional force is generated between the intermediate component 18 and the valve component 14.

Example 6: the valve arrangement 6 any one of examples 1-3, wherein the intermediate frictional force is generated between the intermediate component 18 and the housing 8.

Example 7: the valve arrangement 6 of any one of the preceding examples, wherein the intermediate component 18 comprises an intermediate member 32 and a friction member 34, wherein the intermediate frictional force is generated at least partly by the friction member 34.

Example 8: the valve arrangement 6 of example 5, wherein the valve component 18 comprises a friction member 34, wherein the intermediate frictional force is generated at least partly by the friction member 34.

Example 9: the valve arrangement 6 of example 6, wherein the housing 8 comprises a friction member 34, wherein the intermediate frictional force is generated at least partly by the friction member 34.

Example 10: the valve arrangement 6 of any one of examples 7-9, wherein the intermediate member 32 is made of a relatively rigid material such as metal/plastic/ceramic, and the friction members 34 is made of a relatively soft and/or elastic material such as PTFE or a rubber/elastomer.

Example 11: the valve arrangement 6 according to example 10, wherein the friction member 34 incorporates an energizing resilient element configured to press the friction member 34 towards an opposing surface.

Example 12: the valve arrangement 6 of any of examples 7-11, wherein the friction member 34 is an annular member.

Example 13: the valve arrangement 6 of any one of the preceding examples, wherein the intermediate component 18 is an annular shaped component.

Example 14: the valve arrangement 6 of any one of the preceding examples, wherein the intermediate component 18 is arranged radially inner to the valve component 14 with respect to the central axis X of the housing 8.

Example 15: the valve arrangement 6 of any of examples 1-13, wherein the intermediate component 18 is arranged radially outer to the valve component 14 with respect to the central axis X of the housing 8.

Example 16: the valve arrangement 6 of any of the preceding examples, wherein the valve component 14 comprises a fluid channel 36 configured for communication between the fluid inlet 10 and the fluid outlet 12 when the valve component 14 is not at the first position P1.

Example 17: the valve arrangement 6 of any of the preceding examples, wherein the housing 8 comprises a fluid channel 36 configured for communication between the fluid inlet 10 and the fluid outlet 12 when the valve component 14 is not at the first position P2.

Example 18: the valve arrangement 6 of any one of the preceding examples, wherein the axial distance between the first stop 20 and the second stop 22 is adjustable.

Example 19: the valve arrangement 6 of any one of the preceding examples, configured such that when the valve component 14 is located at an initial return position Pi, wherein at the initial return position Pi the valve component 14 is displaced from the first position P1, during an initial axial return movement of the valve component 14 towards the first position P1, the intermediate component 18 moves relative to the first stop 20 and the second stop 22 until reaching the limit of the range of relative axial movement.

Example 20: a vehicle 2 comprising the valve arrangement 6 according to any of examples 1-19.

The terminology used herein is for the purpose of describing particular aspects only and is not intended to be limiting of the disclosure. As used herein, the singular forms "a", "an", and "the" are intended to include the plural forms as well, unless the context clearly indicates otherwise. As used herein, the term "and/or" includes any and all combinations of one or more of the associated listed items. It will be further understood that the terms "comprises", "comprising", "includes", and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A valve arrangement for a fluid control system, comprising:
   a housing, comprising a fluid inlet, and a fluid outlet, the housing extending along a central axis;
   a valve component, movably arranged along the central axis with respect to the housing between a first position and a second position, wherein at the first position the fluid inlet is closed by the valve component, and wherein a maximum valve lift is defined between the first position and the second position;
a biasing member, configured to bias the valve component towards the first position;
   an intermediate component movably arranged along the central axis with respect to the housing and the valve component;
   a first stop and a second stop,
wherein the intermediate component is axially movable relative to the first stop and the second stop, wherein the valve arrangement is configured such that a range of the relative axial movement is delimited by contact between the intermediate component and the first stop, and the intermediate component and the second stop, wherein the range of relative axial movement is less than the maximum valve lift, and such that: during an initial axial movement of the valve component from the first position, the intermediate component moves relative to the first stop and the second stop, and upon the intermediate component reaching the limit of the range of relative axial movement a subsequent movement of the valve component, in the same direction as the initial axial movement, is opposed by an intermediate frictional force generated at least partly by the intermediate component.

2. The valve arrangement of claim 1, wherein the initial axial movement is opposed by an initial frictional force, and wherein the initial frictional force is less than the intermediate frictional force.

3. The valve arrangement of claim 2, wherein the initial frictional force is at least partly formed by a friction generated between the valve component and the housing.

4. The valve arrangement of claim 2, wherein the initial frictional force is at least partly formed by a friction generated between the intermediate component and the housing.

5. The valve arrangement of claim 1, wherein the intermediate frictional force is generated between the intermediate component and the valve component.

6. The valve arrangement of claim 5, wherein the valve component comprises a friction member, wherein the intermediate frictional force is generated at least partly by the friction member.

7. The valve arrangement of claim 1, wherein the intermediate frictional force is generated between the intermediate component and the housing.

8. The valve arrangement of claim 7, wherein the housing comprises a friction member, wherein the intermediate frictional force is generated at least partly by the friction member.

9. The valve arrangement of claim 1, wherein the intermediate component comprises an intermediate member and a friction member, wherein the intermediate frictional force is generated at least partly by the friction member.

10. The valve arrangement of claim 9, wherein the intermediate member is made of a relatively rigid material, and the friction members is made of a relatively soft and/or elastic material.

11. The valve arrangement according to claim 10, wherein the friction member incorporates an energizing resilient element configured to press the friction member towards an opposing surface.

12. The valve arrangement of claim 9, wherein the friction member is an annular member.

13. The valve arrangement of claim 1, wherein the intermediate component is an annular shaped component.

14. The valve arrangement of claim 1, wherein the intermediate component is arranged radially inner to the valve component with respect to the central axis of the housing.

15. The valve arrangement of claim 1, wherein the intermediate component is arranged radially outer to the valve component with respect to the central axis of the housing.

16. The valve arrangement of claim 1, wherein the valve component comprises a fluid channel configured for communication between the fluid inlet and the fluid outlet when the valve component is not at the first position.

17. The valve arrangement of claim 1, wherein the housing comprises a fluid channel configured for communication between the fluid inlet and the fluid outlet when the valve component is not at the first position.

18. The valve arrangement of claim 1, wherein the axial distance between the first stop and the second stop is adjustable.

19. The valve arrangement of claim 1, configured such that when the valve component is located at an initial return position, wherein at the initial return position the valve component is displaced from the first position, during an initial axial return movement of the valve component towards the first position, the intermediate component moves relative to the first stop and the second stop until reaching the limit of the range of relative axial movement.

20. A vehicle comprising the valve arrangement according to claim 1.

* * * * *